(12) United States Patent
Hulshoff (10) Patent No.: US 6,354,233 B1
(45) Date of Patent: Mar. 12, 2002

(54) SEWING OR EMBROIDERY MACHINE (75) Inventor: Hartmut Hulshoff, Battenberg (DE)

(73) Assignee: G.M. Pfaff Aktiengesellschaft In Insolvenz (DE)

( * ) Notice: Subject to any disclaimer, the term of this patent is extended or adjusted under 35 U.S.C. 154(b) by 0 days.

(21) Appl. No.: 09/673,353

(22) PCT Filed: Apr. 13, 1999

(86) PCT No.: PCT/EP99/02460

§ 371 Date: Oct. 13, 2000

§ 102(e) Date: Oct. 13, 2000

(87) PCT Pub. No.: WO99/53127

PCT Pub. Date: Oct. 21, 1999

(30) Foreign Application Priority Data

Apr. 15, 1998 (DE) .......................................... 198 16 607
Feb. 12, 1999 (DE) .......................................... 199 06 433

(51) Int. Cl.[7] .......................... D05B 19/16; D05B 27/24; D05B 29/02
(52) U.S. Cl. .................. 112/470.01; 112/220; 112/239; 112/323; 112/470.18
(58) Field of Search ...................... 112/470.01, 470.18, 112/239, 220, 314, 315, 319, 323, 324

(56) References Cited

U.S. PATENT DOCUMENTS

| 3,735,717 A | 5/1973 | Vonbrimer et al. ......... 112/220 |
| 3,984,745 A | 10/1976 | Minalga ...................... 318/567 |
| 4,016,441 A | 4/1977 | Herr et al. ..................... 310/13 |
| 4,120,254 A | * 10/1978 | Herr et al. .............. 112/220 X |
| 4,286,197 A | 8/1981 | Eberhard et al. ............. 318/38 |
| 4,428,313 A | 1/1984 | Takiguchi et al. ........... 112/220 |
| 4,507,597 A | 3/1985 | Trost .......................... 318/653 |
| 4,690,081 A | * 9/1987 | Castagna et al. ........... 112/276 |
| 5,551,361 A | 9/1996 | Clapp et al. ........... 112/475.01 |

* cited by examiner

Primary Examiner—Peter Nerbun
(74) Attorney, Agent, or Firm—McGlew and Tutle, P.C.

(57) ABSTRACT

A sewing or embroidery machine, comprising a needle, a gripper and a workpiece advancing device with at least one driven advancing element. Said advancing device has a linear drive for driving the advancing element. The linear drive has two armatures which can be driven in different directions. A control device with a control circuit for the horizontal movements and a control circuit for the vertical movements of the advancing element is allocated to the advancing device and both control circuits are subordinate to a main control device comprising a data processing device. Said main control device receives synchronization impulses from an encoder according to the current position of the needle or the gripper. The actual values of the horizontal and/or vertical movements of the advancing element can be supplied to the main control device at option.

37 Claims, 6 Drawing Sheets

SEWING OR EMBROIDERY MACHINE

The present invention pertains to a sewing or embroidery machine.

Prior-art sewing machines have, in general, a hook cooperating with a thread-carrying needle as well as a feed device with a drive for the feed element and a holding-down means with a presser foot for the fabric being sewn.

During the sewing operation, the fabric being sewn is usually held between the feed element and the presser foot, which lies on the fabric being sewn in a non-positive manner. The feed element, which is usually driven in a positive-locking manner and is provided with teeth on its top side, moves forward out of the area of the needle plate during the feed phase proper and presses the fabric to be sewn against the presser foot and it pushes the presser foot upward. The feed element now performs an essentially elliptical movement, and the feed movement proper takes place in the direction of the longitudinal axis of the ellipse and the lifting movement in the direction of the minor axis of the ellipse.

If these movements are brought about by means of mechanical gears, cam or control lever mechanisms are usually used for this purpose, and the stitch length can be changed by displacing the articulation points in the case of control lever mechanisms and either by changing the effective eccentricity of the cam or by changing the oblique position of the corresponding crank in the case of cam mechanisms. Thus, while the stitch length can be changed during sewing by actuating a manual button or another actuating means, the lifting movement of the feeder can be changed by an intervention performed by means of tools only when the machine has been stopped.

It has become known from DE 29 03 031 in connection with pattern-forming zigzag sewing machines that the feeder can be moved by means of an impulse motor via linkages and lever mechanisms in order to thus bring about a change in the length of the corresponding sewing pattern by changing the stitch length. To make it possible to change the width of the sewing pattern during sewing as well, the drive generating the transverse movement of the needle bar also has an impulse motor, by means of which the overstitch width of the needle movement can be changed.

Even though it is thus known that both the overstitch width of the needle movement and the stitch length can be changed during sewing, also changing the amount of the vertical movement of the feed element during sewing has not become known since.

In prior-art sewing machines, the feed element strikes the presser foot in a rapid sequence during sewing, and the force with which the spring presses down the presser foot is selected to be relatively strong in order to prevent the presser foot from being lifted off from the fabric being sewn.

However, a temporary separation of the presser foot from the fabric being sewn cannot always be prevented even in the case of a relatively strong pressing force of the presser foot, which is on the order of magnitude of more than 6 kg, especially at high speeds of sewing, at which the forcibly driven feed element strikes the underside of the presser foot in a correspondingly rapid sequence and the presser foot is set to vibrate. This results, on the one hand, in a non-uniform feed of the fabric being sewn and, on the other hand, in an adverse effect on the quality of sewing due to the resulting non-uniform tapering of the stitch.

DE 36 36 548 A1 describes a sewing machine in which the presser foot for the fabric being sewn can be raised by means of a servo coil. The pressing force of the presser foot on the fabric being sewn can be set by means of another servo coil. Furthermore, the stitch length can be preset here manually and can be reduced by means of a servo magnet.

The values of the pressing force of the presser foot, which are read into a memory via a potentiometer, can be compared with preset values during the operation of the sewing machine, so that the pressing force of the presser foot on the fabric being sewn can be changed correspondingly. A dependence of the pressing force of the presser foot on the movement characteristic of the feed element is not intended here and is not achieved, either.

The basic object of the present invention is to provide a feed means for sewing machines of this class, which makes it possible, while guaranteeing a corresponding synchronization of the horizontal and vertical movements of the feed elements, to vary these [movements] independently from one another during sewing even at high speeds of rotation.

This object is accomplished in a sewing machine of this class by the feed means for driving the feed element having a linear drive with two drivable elements (rotors), wherein one rotor is movable in the horizontal direction and the other rotor in the vertical direction, and that a control means with a control circuit for the horizontal movements as well as with a control circuit for the vertical movements of the feed element is associated with the feed means, wherein both control circuits are subordinated to a main control means, which has a data processing means and receives its synchronization impulses from an encoder as a function of the particular instantaneous position of the needle or hook, and to which the actual values of the horizontal and/or vertical movements of the feed element can be alternatingly sent.

This offers the possibility of changing both the amount and the phase position of the vertical movement of the feed element independently from both the amount and the phase position of its horizontal movement and of affecting the amount of the vertical movement of the feed element independently from its horizontal movement such that a sufficient flux of force is guaranteed between the fabric being sewn and the feed element, on the one hand, and, on the other hand, it is not necessary to select a needlessly strong contact pressure of the presser foot. It is, of course, also possible to vary the phase position of the vertical movement and/or the phase position of the horizontal movement of the feed element within limits preset by the requirements of stitch formation in relation to the phase position of the movement of the needle and/or hook.

While the intervention with the movement characteristic of the feed element is performed exclusively to change the stitch length in the prior art, intervention in the characteristic of the vertical and/or horizontal movement of the feed element is possible according to the present invention at any time due to the main control means (even while the stitch length is maintained) during each and every stitch formation operation In order to always perform the entire phase of stitch formation while maintaining optimal conditions.

All the mechanical components, such as shafts and gear trains, which are needed in prior-art sewing machines to move the feed element and to change its movement, may be eliminated due to the present invention, and so are, in particular, the electromechanical auxiliary units which are known in sewing machines with automatically adjustable stitch length and sewing direction as well. The stitch length and the sewing direction can be changed at full sewing speed.

Another object of the present invention is to provide feed and holding-down means for a sewing machine of this class, which make it possible to affect the cooperation of the presser foot with the feed element such that the pressing force of the presser foot can be adjusted during the sewing operation to the particular instantaneous velocity and the instantaneous vertical force of the feed element.

This object is accomplished in sewing machines of this class by the cooperation of the feed element with the presser foot being able to be regulated by a main control means having a data processing means and acting on both a control means for the drive of the feed element and on a control means for the drive of the presser foot such that the pressing force of the presser foot follows the instantaneous movement of the feed element, wherein the main control means receives its synchronization from an encoder as a function of the particular instantaneous position of the needle or hook.

The pressing force of the presser foot can be adjusted by the main control means to the movement characteristic of the feed element during every individual feed step of the feed element and consequently during the entire stitch formation operation in this case as well. Since the pressing force of the presser foot can be adjusted to the particular instantaneous velocity of the feed element correctly for the particular stitch for the entire sewing operation, an optimal cooperation between the presser foot and the feed element and consequently a considerable improvement of the quality of sewing are achieved while both the noise level and the vibrations of the sewing machine are reduced at the same time.

An embodiment that is favorable in terms of control engineering is obtained by the actual values of the vertical movements and/or the horizontal movements of the feed element, but especially the actual values of the vertical movements being able to be sent to the main control means, and by the control of the drive for the presser foot being performed as a function of the actual values of the feed element, especially the actual values of the vertical movement of the feed element.

To make it possible to move the presser foot rapidly into its two end positions or into its working position at both the beginning and the end of the sewing and optionally also during interruptions in sewing, the presser foot can be moved alternatingly into its upper or lower end position by means of external signals that can be sent to its drive. The presser foot can thus be moved rapidly into its end positions or into its working position, in which it will apply a pressing force on the fabric being sewn, which force is adjusted to the movement characteristic of the horizontal or vertical movement of the feed element.

The mechanical components such as leaf springs, bowden cable, toggle levers and the magnet of the presser foot, which are needed for actuating the presser foot, are eliminated by the present invention.

Based on the horizontal and vertical movements of the feed element being controlled independently from one another and due to the changing of the vertical and/or horizontal movements of the feed element, the present invention offers the possibility of also using the feed element at the same time as a carrier bracket for a catch thread device/thread cutter to be fastened thereto and of moving this [the feed element] together with the catch thread device/thread cutter such that the bobbin thread and the leg of the needle thread loop to be caught can be caught by the catch thread device/thread cutter and fed to a cutter during an increased horizontal movement and optionally also an increased vertical movement of the feed element, which can be initiated by an external signal that can be sent to the drive of the feed means. Compared with the prior-art thread-cutting system, this leads to a substantial reduction in the effort needed for catching needle and bobbin threads and the cutting operation can take place at a higher sewing speed.

According to another suggestion according to the present invention, the external signal that can be sent to the drive of the feed means for increasing the movement of the feed element may also be used to release the tensioning means for the needle thread.

If the catch thread device has caught the leg of the needle thread loop leading to the fabric being sewn, an optimally short end of the needle thread remaining on the fabric being sewn and a free length of the needle thread remaining on the thread reserve which guarantees reliable resewing can be obtained as a result.

To make it possible to store and poll various sewing and fabric parameters, such as the stitch length, feed velocity, pressing force of the presser foot as well as structure, thickness or surface finish of the fabric, as well as auxiliary functions, such as the raising and lowering of the presser foot or thread cutting, the data processing means has a memory for various sewing parameters and auxiliary functions, which can be polled by means of a control panel or an interface and can be sent to the main control means.

A quickly responding drive for the holding-down means can be obtained by designing this drive as an electronically controlled, electromagnetic single-axis linear drive, whose rotor is directly connected to the carrier bracket for the presser foot.

A quickly responding drive for the feed means can also be obtained by designing the electromagnetic linear drives of the feed means as a biaxial linear drive with two rotors that are connected to one another in terms of movement, one rotor being able to be driven in the horizontal direction and the other rotor in the vertical direction.

The movement of the rotor for the horizontal movement of the feed element may be able to be controlled in this case independently or depending on the movement of the rotor for the vertical movement of the feed element.

In a solution of simple design, the two rotors of the biaxial linear drive are integrated in one rotor, which can be driven in both the horizontal and vertical directions.

A solution in which only weak inertia forces are to be overcome for the movement of the feed element is obtained by the feed element being directly connected to one rotor or both rotors for its vertical and horizontal movement.

To make it possible to use the stator at the same time as a guide for the rotor and to accommodate at the same time a sufficient magnetic mass in the air gap, the rotors of the biaxial linear drive have a prismatic design and comprise polarized permanent magnets without iron short-circuit, as a result of which a favorable force-to-mass ratio of the magnetic material is obtained. These advantages are also achieved in the same manner in the case of the use of a prismatic rotor for the drive of the presser foot.

A solution that is characterized by wear resistance for high load cycles is obtained if the linear drives are designed as brushless linear drives.

To determine the particular instantaneous position of the feed element and of the presser foot, it is advantageous to connect the rotors of the linear drives indirectly or directly with a respective encoder, wherein the encoders for the horizontal and vertical movement of the feed element are integrated in a two-dimensional encoder, to which two mutually independent evaluating means are assigned.

The encoder disk advantageously has two groups of line elements, of which the first group extends in a first direction and can be scanned by the first evaluating means, while the second group extends in a second direction and can be scanned by the second evaluating means.

Further details and advantages of the present invention will appear from the following description of an exemplary embodiment shown in the attached drawing.

Figure 1:
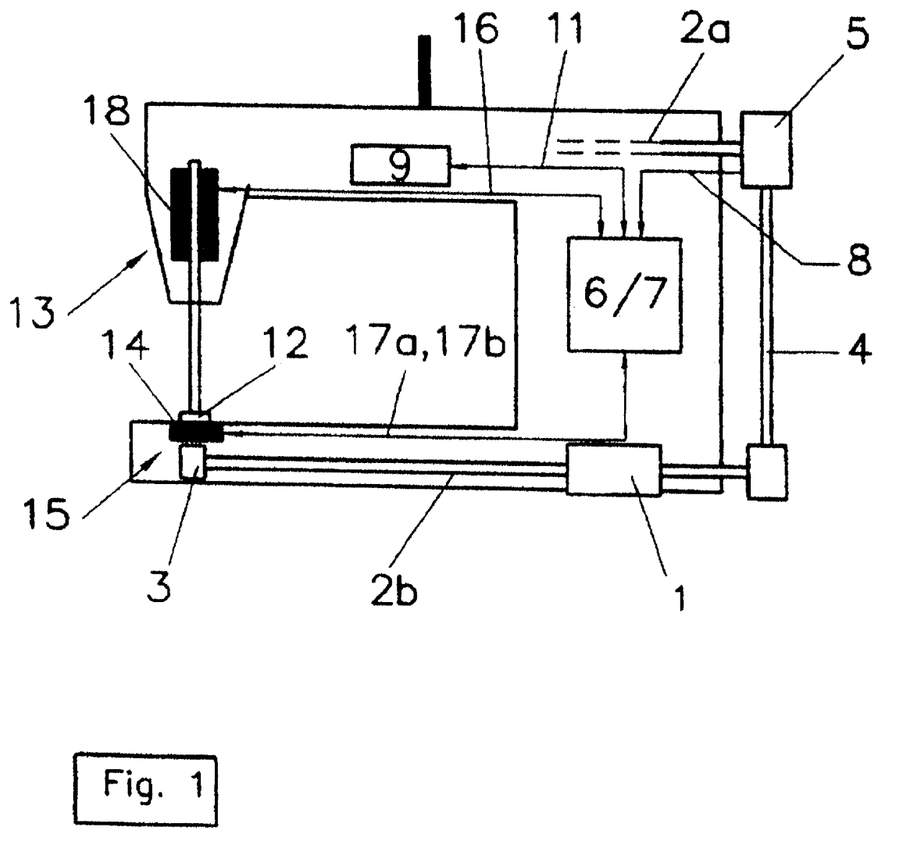
FIG. 1 shows a schematic representation of a sewing machine.

FIG. 1 shows a sewing machine, not identified more specifically, which has a motor 1, which drives a hook 3 via a shaft 2b. Via a belt drive 4, the motor 1 drives at the same time a shaft 2a arranged in the arm of the sewing machine, at the front end of which (not shown) a drive for a thread-carrying needle is provided. The needle, which can be moved up and down, cooperates with the hook 3 for looping the needle thread and the bobbin thread in the usual manner.

An encoder 5, which will be described in detail later and which reports the particular instantaneous position of the needle and consequently also of the hook 2 in the form of synchronization pulses via a line 8 to a main control means 6, which also comprises a data processing means 7, is arranged on the free end of the shaft 2a.

A control panel 9 or an interface for connecting a control panel 9, by means of which the individual sewing and fabric parameters, such as the stitch length, feed velocity, the pressing force of the presser foot, as well as the structure, thickness or surface finish of the fabric, as well auxiliary functions, such as the raising and lowering of the presser foot or thread cutting, can be selected and read from a memory of the data processing means 6 and can be sent via the said data processing means to the main control means, is arranged in the arm of the sewing machine.

The control panel 9 is connected for this purpose to the main control means 6 via a line 11. A control means for the movement of a presser foot 12 of a holding-down means 13, as well as a control means for the movements of a feed element 14 of a feed means 15 are subordinated to this [main control means]. The control means for the feed element 14 has two control circuits, one of which is used to control the horizontal movement of the feed element 14 and the other control circuit is used to control the vertical movement of the feed element 14. The holding-down means 13 is connected to the main control means 6 via a line 16 and the feed means 15 is connected to the main control means 6 via a line 17a, 17b.

The function of the control means and the two control circuits mentioned will be described in greater detail below.

Figure 5:
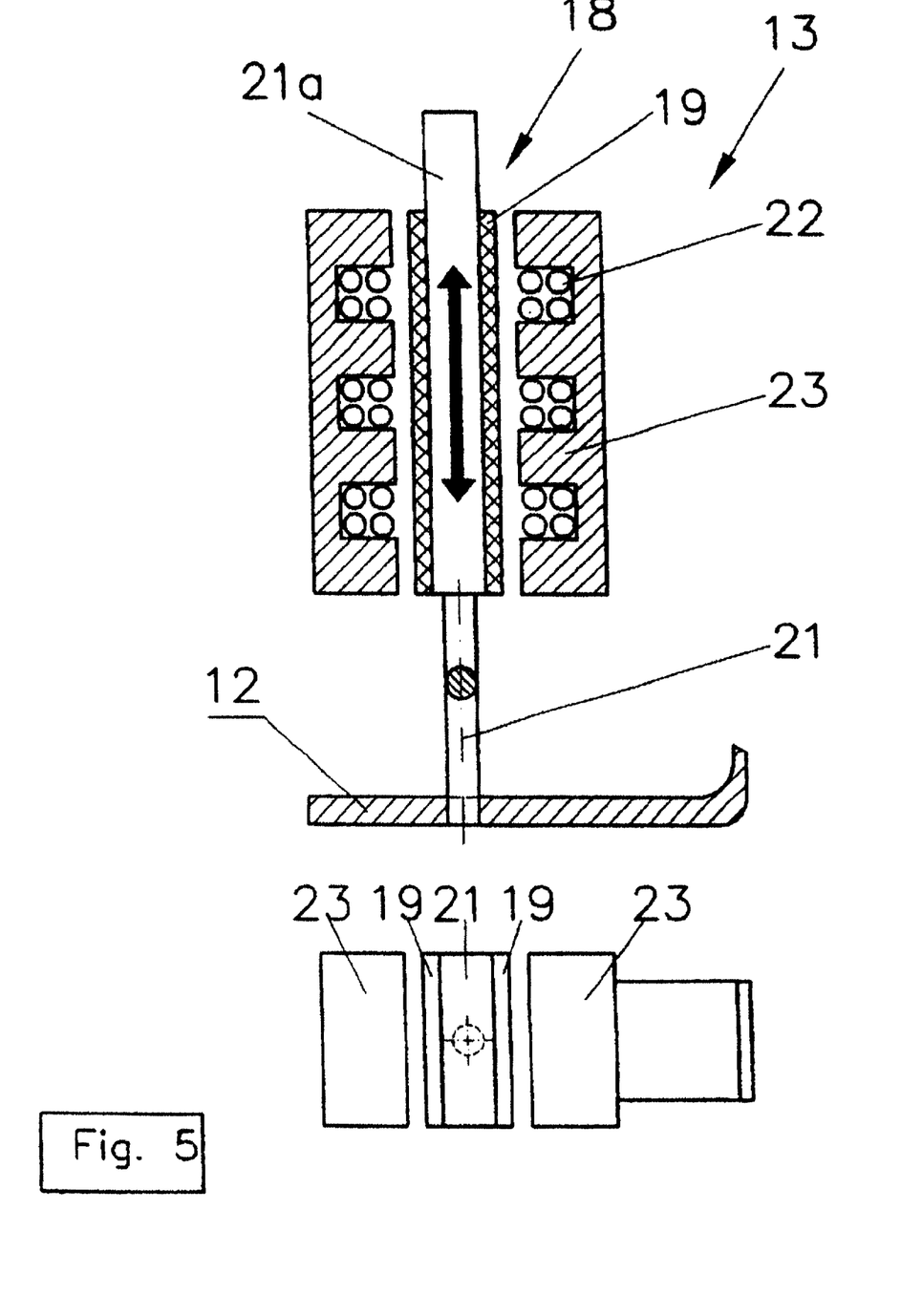
FIG. 5 shows the general design of the drive for the presser foot.

To drive the presser foot 12, the holding-down means 13 has a preferably brushless electromagnetic single-axis linear motor 18, whose driven element (armature 19) (FIG. 5) is directly connected to a carrier bracket 21 or 21a for the presser foot 12. The armature 19 is formed by polarized permanent magnets, which are surrounded by windings 22 of a stator 23 wound preferably with copper wires. The stator 23 may be arranged either symmetrically or asymmetrically to the armature 19 and the carrier bracket 21 or 21a. The carrier bracket 21 and 21a preferably has a prismatic cross section consisting of a very lightweight nonferrous material and if the magnet material has a sufficient intrinsic rigidity, it may extend from the presser foot 12 only to the lower end of the armature 19, so that the area 21a is eliminated.

Figure 2:
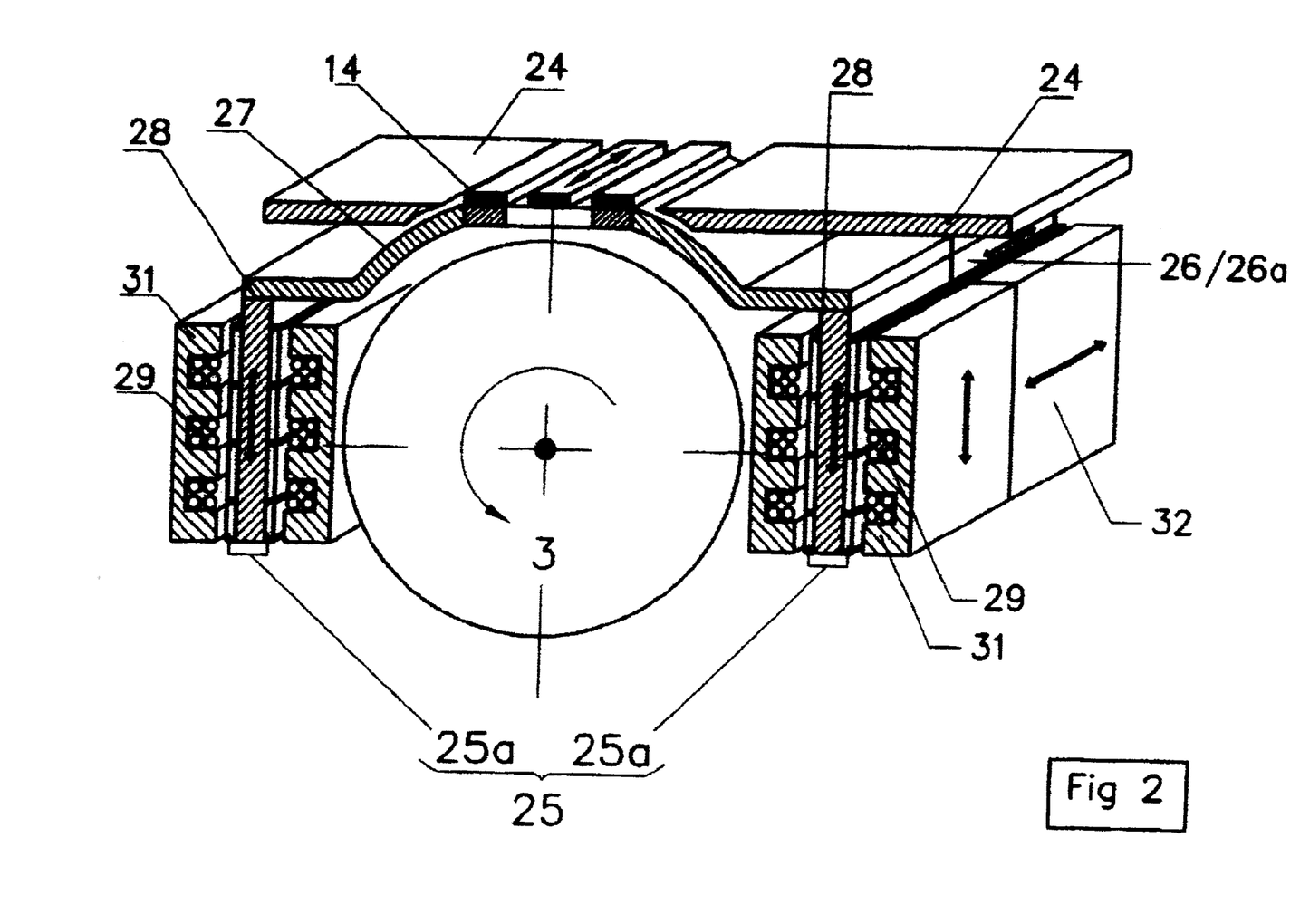
FIG. 2 shows a perspective view of the feed element with the drives for its vertical and horizontal movement.

An electromagnetic linear drive is also used to drive the feed element 14, which may be formed by a feeder, which passes through corresponding slots in a needle plate 24 and is provided with teeth in the usual manner. This linear drive has two drivable elements (armature 25 and armature 26), which can be moved at right angles in relation to one another. The armature 25 brings about the vertical movement of the feed element 14, while the armature 26 brings about its horizontal movement.

In the exemplary embodiment of the present invention shown in the drawing, a carrier bracket 27 is provided to accommodate the two armatures 25, 26, the said carrier bracket extending in its middle area corresponding to the diameter of the hook 3 and has two, preferably symmetrical brackets 28, which are bent down at right angles. At least the bent areas of the brackets 28 consist of very lightweight nonferrous material and are equipped with permanent magnets 25a on both sides. If the material of the permanent magnets 25a has sufficient intrinsic rigidity, the bent areas of the brackets 28 may be abandoned, so that the permanent magnets 25a can act directly on the horizontally directed areas of the brackets 28. The permanent magnets 25a form one armature 25 of the biaxial linear drive, with which stators 31 wound with copper wires 29 are associated.

The armature 26 used to bring about the horizontal movement of the feed element 14 is arranged behind the armature 25 (when viewed in the direction of feed of the fabric). The basic design of the armature 26 as well as a stator 32 associated therewith corresponds to the design of the armature 25 and of the stator 31. Since the armature 26 together with the stator 32 is used to bring about the horizontal movement of the feed element 14, the permanent magnets are arranged offset by 90° in relation to the arrangement of the permanent magnets of the armature 25, so that the direction of action is also offset by 90° in relation to the direction of action of the armature 25. Both armatures 25, 26 thus form a biaxial linear drive, which has a brushless design, with the corresponding stators 31, 32.

To determine the particular position of the feed element 14, a two-dimensional encoder 40 is provided (FIG. 3), which is connected to the armature 25 or the carrier bracket 27. The encoder 40 has a double photoelectric cell 41, 41a and 42, 42b, into which a tongue 43 immerses, the said tongue being connected to the feed element 14 and provided with a double coding. The tongue 43 has vertically extending code lines 44 in its top part and horizontally extending code lines 45 in its lower part.

Figure 3:
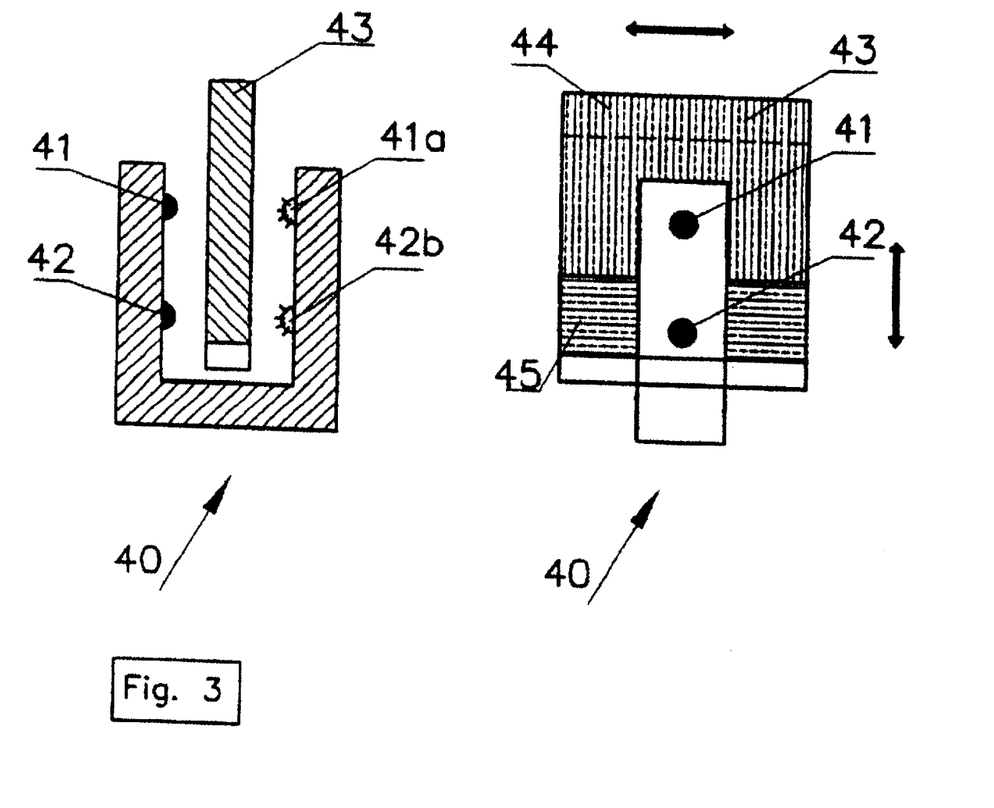
FIG. 3 shows a representation of the encoder.

Since the vertical movement of the feed element 14 is relatively small compared with its horizontal movement, the two code lines 44, 45 can be evaluated simultaneously and the corresponding signals can be sent to the control means for the feed element 14. An evaluating means, not shown in detail, which evaluates both the photoelectric cell 41, 41a and the photoelectric cell 42, 42b, is provided to evaluate the encoder 40.

Figure 4:
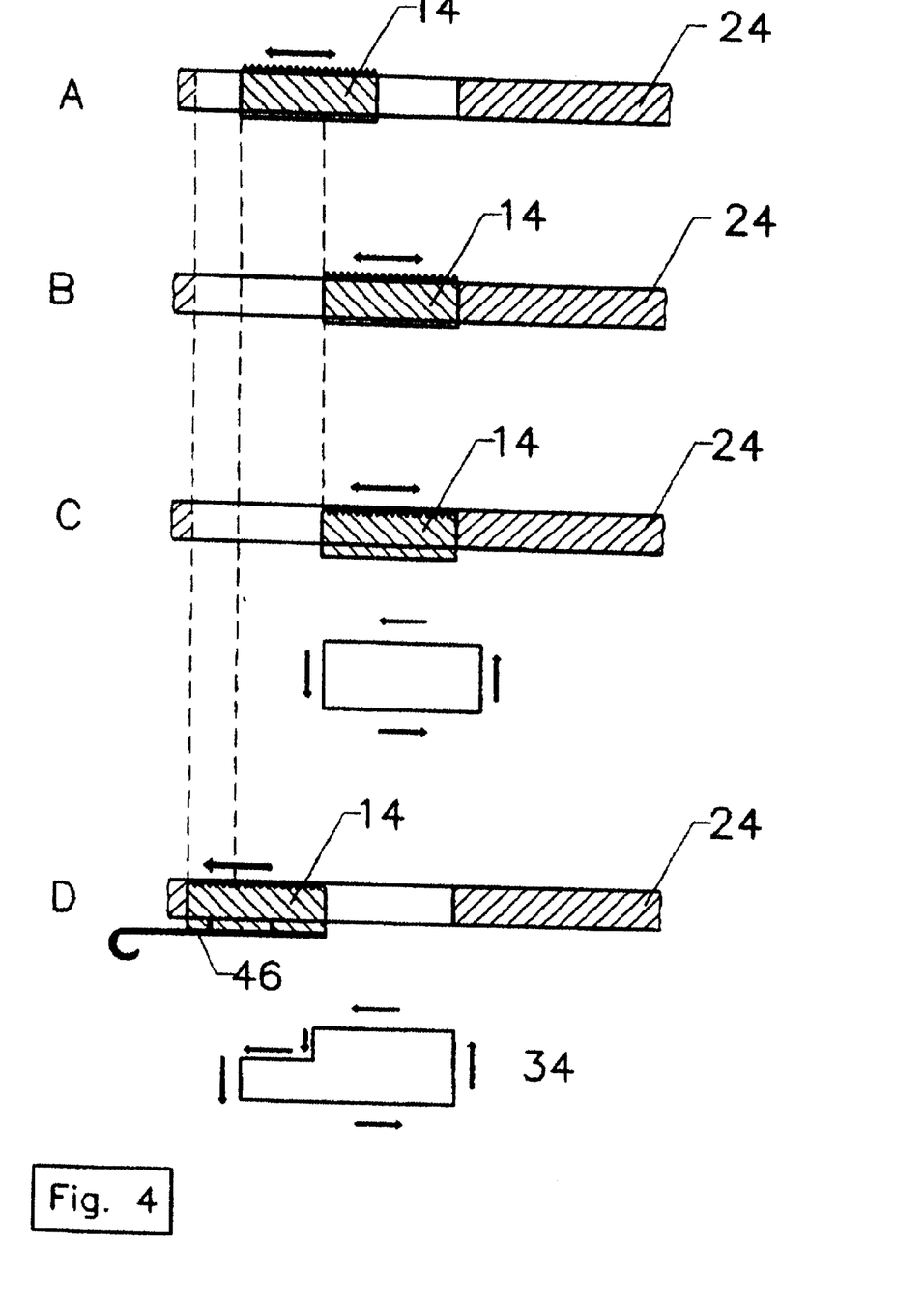
FIG. 4 shows a representation of the individual movement sections of the feed element.

The needle plate 24 is shown in FIG. 4 together with the feed element 14 and a catch thread device/thread cutter 46, the feed element 14 being shown in different positions of its movement phase. In the representations A and B, the feed element 14 is shown in its two horizontal end positions during sewing. In representation C, the feed element 14 is also in the horizontal position shown in representation B, but it is in its lower end position during sewing. The rectangle shown under the representation C symbolizes, together with the arrows, the nearly rectangular path of movement of the feed element for sewing. The catch thread device/thread cutter 46 fastened to the feed element 14 participates in these movements without affecting the hook and/or needle thread. The stitch formation is not hindered by the catch thread device/thread cutter 46, either.

To catch and cut the hook and needle thread, the feed element 14 performs an increased movement compared with its usual path of movement, and both the horizontal and the vertical movement components are changed (increased) such that the catch thread device/thread cutter 46 catches the bobbin thread directly at the stitch hole (not shown) and moves into the thread triangle formed by the needle thread in order to catch the leg of the needle thread leading to the fabric. The cutting proper of the threads caught is then performed during or at the end of the reverse movement of the feed element from the catching position of the catch thread device/thread cutter 46 shown in representation D into the cutting position proper of the catch thread device/thread cutter 46, which is located in the area of the (horizontal) end position of the feed element 14 shown in representation C. In another variant, the catch thread device/thread cutter 46 performs the cutting already during the increased forward and lowering movement of the feed element 14 shown in representation D. For cutting, both threads are moved against an opposite cutting edge or a cutter and cut. The free end of the bobbin thread reserve is now pressed against a sticky or velcro-like roughened surface and is held there.

The data needed to perform the movement of the feed element 14 and the catch thread device/thread cutter 46, which is symbolized by a stepped rectangle and the arrows under the representation D [tentative translation, error in German original—Tr.Ed.] are stored in the memory of the data processing means and can be polled via the control panel 9 or the interface.

In prior-art thread-cutting means, it is necessary for reliably catching the bobbin thread and especially the part of the needle thread triangle leading to the fabric to move the catch thread device/thread cutter 46 into the needle thread triangle accurately in time. This can be guaranteed relatively easily according to the present invention despite the fixed association of the catch thread device/thread cutter 46 with the feed element by both the horizontal movement and the vertical movement of the catch thread device/thread cutter 46 being able to be controlled independently in time from the movement of the hook.

Figure 6:
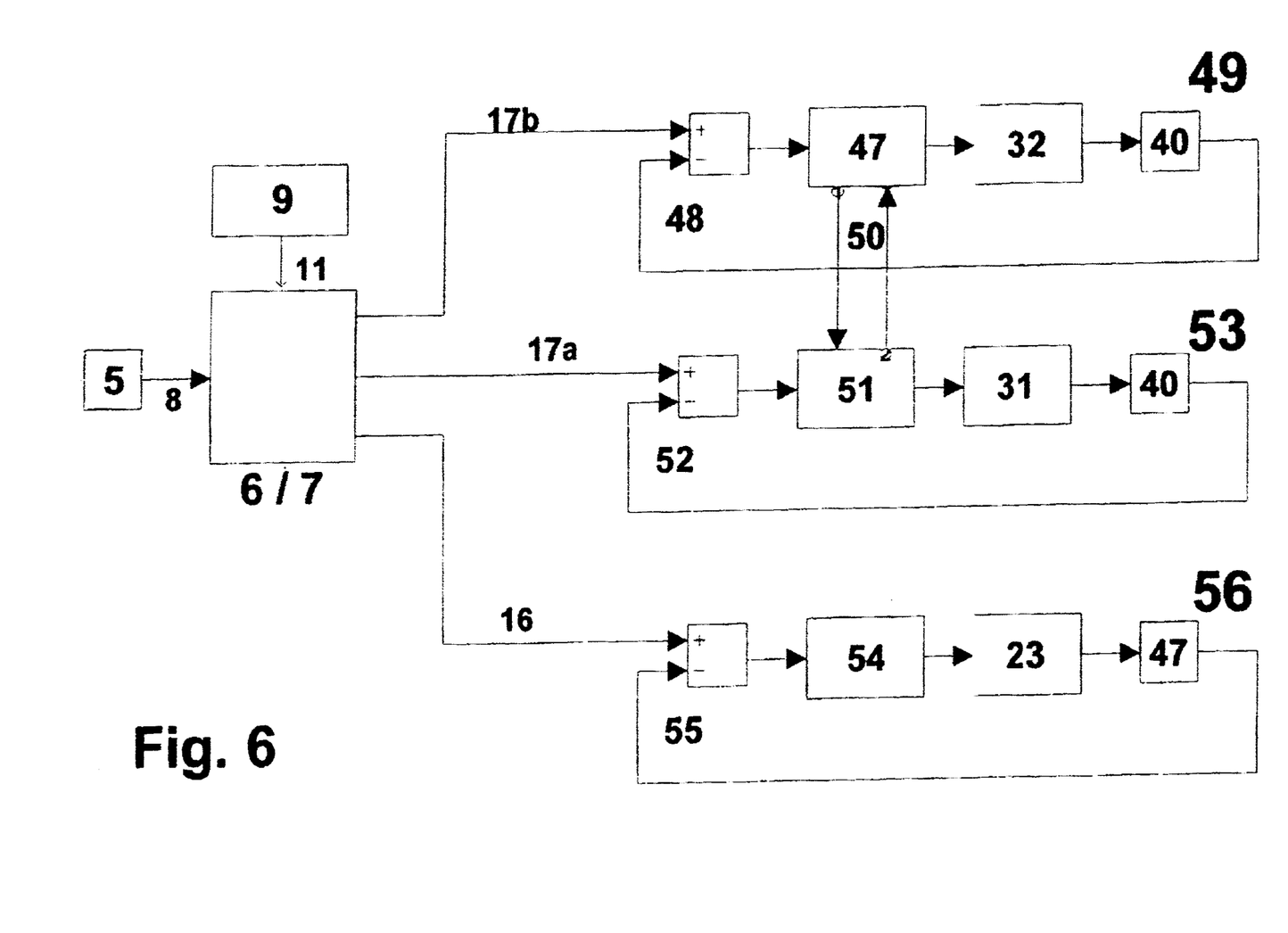
FIG. 6 shows a schematic representation of the control circuits.

The control circuit for the horizontal movement of the feed element is designated in FIG. 6 by reference number 49, the control circuit for its vertical movement is designated by 53, and the control circuit for the presser foot 12 is designated by 56. The control circuit 49 is connected to the main control means 6 having a data processing means 7 via the line 17b, the control circuit 53 is connected thereto via the line 17a, and the control circuit 56 is connected thereto via the line 16. In addition, the control panel 9 is connected to the main control means 6 via the line 11 and the encoder 5 is connected thereto via the line 8.

The set points for the presser foot 12 are sent to the control circuit 56 from the main control means 6 via the line 16. The control means determines the necessary adjusting signals for the stator 23 from the difference between the particular set point and the actual value 55. The encoder 47 measures the instantaneous positions of the presser foot 12 and sends back the actual value 55 to the control means 54.

The set points for the vertical positions of the feed element 14 are sent from the main control means 6 to the control circuit 53 via the line 17a. The control means 51 determines the necessary adjusting signals for the stator 31 from the difference between the particular set point and the actual value 52. The encoder 40 measures the instantaneous vertical positions 52 of the feed element 14 and sends back the actual value 52 to the control means 51.

The set points for the horizontal positions of the feed element 14 are sent from the main control means 6 to the control circuit 49 via the line 17b. The control means 47 determines the necessary adjusting signals for the stator 32 from the difference between the particular set point and the actual value 48. The encoder 40 measures the instantaneous horizontal positions 48 of the feed element 14 and sends back the actual value 48 to the control means 47.

In the practical embodiments, the control means 47, 51 and 54 as well as the main control means 6 are embodied with data processing means 7 in an integrated computer; therefore, there is an information coupling between the said control means for all actual values and set points, which may optionally be used by each of the control means to solve control tasks. A data line 50 between the two control means 47, 51 is shown symbolically herefor in FIG. 6.

What is claimed is:

1. A sewing or embroidery machine, comprising:

a thread-carrying needle;

a sewing hook/looper interacting with said needle;

an encoder generating a signal of a particular actual position of the needle or hook;

a main control with a data processor;

a workpiece feed drive for at least one feed element movable along a predeterminable path, the workpiece feed driving the feed element with a linear drive with two drivable armatures, wherein one armature is movable in the horizontal direction and the other armature is movable in the vertical direction, and the workpiece feed drive has a control dedicated to said workpiece feed with a control circuit for the vertical movements of the feed element and a control circuit for horizontal movements, wherein both said control circuits are subordinated to said main control and receive synchronization pulses from said encoder as a function of the particular actual position of the needle or hook and actual values of the horizontal and/or vertical movements of the feed element can be sent to said main control.

2. A sewing or embroidery machine, comprising:

a thread-carrying needle;

a sewing hook/looper interacting with said needle;

a workpiece feed with a drive for at least one feed element movable along a predeterminable path and with a holding-down device with a drive for a presser foot for the workpiece;

an encoder providing a signal as a function of the particular actual position of the needle or hook;

a control device for the drive of said feed element as well as a control device for the drive of said presser foot;

a main control with a data processor for controlling the cooperation of the feed element with the presser foot, said main control is both controlled by and acts on said control device for the drive of said feed element as well as said control device for the drive of said presser foot, such that a pressing force of said presser foot follows the actual movement of said feed element, wherein said main control means receives synchronization pulses from said encoder as a function of the particular actual position of the needle or hook.

3. A sewing or embroidery machine in accordance with claim 2, wherein the actual values of vertical movements and/or horizontal movements of said feed element can be sent to said main control and the drive for said presser foot is controlled as a function of the actual values of said feed element.

4. A sewing or embroidery machine in accordance with claim 2, wherein said presser foot can be moved alternatingly into its upper or lower end position by external signals sent to said presser foot drive.

5. A sewing or embroidery machine according to claim 2, further comprising:
a thread-cutter catch thread device/thread cutter catching the bobbin thread and one leg of the needle thread loop under the needle plate, said catch thread device/thread cutter being arranged on said feed element such that the bobbin thread and one leg of the needle thread loop can be caught by said catch thread device/thread cutter and fed to a cutter during an increased horizontal and/or vertical movement of said feed element, which can be initiated by an external signal that can be sent to the drive of said feed element.

6. A sewing or embroidery machine according to claim 1, further comprising:
a thread-cutter catch thread device/thread cutter catching the bobbin thread and one leg of the needle thread loop under the needle plate, said catch thread device/thread cutter being arranged on said feed element such that the bobbin thread and one leg of the needle thread loop can be caught by said catch thread device/thread cutter and fed to a cutter during an increased horizontal and/or vertical movement of said feed element, which can be initiated by an external signal that can be sent to the drive of said feed element.

7. A sewing or embroidery machine in accordance with claim 5, wherein said external signal that can be sent to the drive of said feed element for increasing the movement of said feed element is also used to release a tensioning device for the needle thread.

8. A sewing or embroidery machine in accordance with claim 1, wherein said data processor has a memory for various sewing parameters and auxiliary functions, which can be polled by means of a control panel or via an interface and be sent to the said main control.

9. A sewing or embroidery machine in accordance with claim 2, wherein the drive of said holding-down device is designed as an electromagnetic single-axis linear drive, whose armature is directly connected to a carrier bracket for said presser foot.

10. A sewing or embroidery machine in accordance with claim 9, wherein the single-axis linear drive is brushless.

11. A sewing or embroidery machine in accordance with claim 9, wherein said armature of the single-axis linear drive has no iron short-circuit.

12. A sewing or embroidery machine in accordance with claim 2, wherein said carrier bracket for said presser foot has a prismatic cross section.

13. A sewing or embroidery machine in accordance with claim 9, wherein said electromagnetic linear drive of said workpiece feed is designed as an electromagnetic biaxial linear drive with two said armatures connected to one another in terms of movement, wherein one said armature can be driven in the horizontal direction and the said other armature can be driven in the vertical direction.

14. A sewing or embroidery machine in accordance with claim 13, wherein the movement of said armature for the horizontal movement of said feed element can be controlled independently from the movement of said armature for the vertical movement of said feed element.

15. A sewing or embroidery machine in accordance with claim 13, wherein the movement of said armature for the horizontal movement of said feed element can be controlled as a function of the movement of said armature for the vertical movement of said feed element.

16. A sewing or embroidery machine in accordance with claim 13, wherein said two armatures of said biaxial linear drive are integrated in one armature, which can be driven in both the horizontal and vertical directions.

17. A sewing or embroidery machine in accordance with claim 13, wherein said armature drivable in the vertical direction is formed by two armature webs arranged at spaced locations from and in parallel to one another, which are connected to one another by means of a carrier bracket bridging over a free space for the hook.

18. A sewing or embroidery machine in accordance with claim 13, wherein said feed element is directly connected to said armatures for its vertical and horizontal movement.

19. A sewing or embroidery machine in accordance with claim 13, wherein said armatures of the biaxial linear drive have a prismatic design and consist of polarized permanent magnets.

20. A sewing or embroidery machine in accordance with claim 19, wherein said permanent magnets are arranged and polarized such that their first group brings about the vertical movement of said feed element and their second group brings about the horizontal movement of said feed element.

21. A sewing or embroidery machine in accordance with claim 13, wherein the biaxial linear drive has a stator designed such that a first group of the windings or of the stator poles brings about the vertical movement of said feed element in cooperation with the first group of the permanent magnets, and the second group of the windings or of the stator poles brings about the horizontal movement of said feed element in cooperation with the second group of the permanent magnets.

22. A sewing or embroidery machine in accordance with claim 13, wherein said armatures of the biaxial linear drive have no iron short-circuit.

23. A sewing or embroidery machine in accordance with claim 13, wherein the biaxial linear drive is designed as a brushless linear drive.

24. A sewing or embroidery machine in accordance with claim 13, wherein said feed element is arranged directly on said carrier bracket.

25. A sewing or embroidery machine in accordance with claim 13, wherein said armatures of the biaxial linear drive are connected indirectly or directly to said encoder and said encoder is a two-dimensional encoder.

26. A sewing or embroidery machine in accordance with claim 25, wherein two mutually independent evaluating means are associated with said two-dimensional encoder.

27. A sewing or embroidery machine in accordance with claim 25, wherein said two-dimensional encoder has two photoelectric cells or two Hall probe arrays.

28. A sewing or embroidery machine in accordance with claim 25, wherein said encoder includes a disk with two groups of line elements including a first group which extends in a first direction and can be scanned by a first photoelectric cell and a second group extends in a second direction and can be scanned by a second photoelectric cell.

29. A sewing or embroidery machine in accordance with claim 25, wherein said encoder disk has two differently coded areas, of which the first area can be scanned by a Hall probe array and the second area by a second Hall probe array.

30. A sewing or embroidery machine in accordance with claim 1, wherein said electromagnetic linear drive of said workpiece feed is designed as an electromagnetic biaxial linear drive with said armatures connected to one another in terms of movement, wherein one said armature can be driven in the horizontal direction and the said other armature can be driven in the vertical direction.

31. A sewing or embroidery machine in accordance with claim 30, wherein the movement of said armature for the horizontal movement of said feed element can be controlled independently from the movement of said armature for the vertical movement of said feed element.

32. A sewing or embroidery machine in accordance with claim 30, wherein the movement of said armature for the horizontal movement of said feed element can be controlled as a function of the movement of said armature for the vertical movement of said feed element.

33. A sewing or embroidery machine in accordance with claim 30, wherein said two armatures of said biaxial linear drive are integrated in one armature, which can be driven in both the horizontal and vertical directions.

34. A sewing or embroidery machine in accordance with claim 30, wherein said armature drivable in the vertical direction is formed by two armature webs arranged at spaced locations from and in parallel to one another, which are connected to one another by means of a carrier bracket bridging over a free space for the hook.

35. A sewing or embroidery machine in accordance with claim 30, wherein the biaxial linear drive has a stator designed such that a first group of the windings or of the stator poles brings about the vertical movement of said feed element in cooperation with the first group of the permanent magnets, and the second group of the windings or of the stator poles brings about the horizontal movement of said feed element in cooperation with the second group of the permanent magnets.

36. A sewing or embroidery machine in accordance with claim 30, wherein said armatures of the biaxial linear drive are connected indirectly or directly to said encoder and said encoder is a two-dimensional encoder.

37. A sewing or embroidery machine in accordance with claim 36, wherein two mutually independent evaluating means are associated with said two-dimensional encoder.

* * * * *